United States Patent
Miyazoe et al.

(10) Patent No.: US 10,900,581 B2
(45) Date of Patent: Jan. 26, 2021

(54) MANIFOLD BASE FOR ELECTROMAGNETIC VALVE AND MANIFOLD-TYPE ELECTROMAGNETIC VALVE

(71) Applicant: SMC CORPORATION, Chiyoda-ku (JP)

(72) Inventors: Shinji Miyazoe, Moriya (JP); Shinichi Yoshimura, Moriya (JP); Masaru Yoshida, Ushiku (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/485,542

(22) PCT Filed: Feb. 6, 2018

(86) PCT No.: PCT/JP2018/003887
§ 371 (c)(1),
(2) Date: Aug. 13, 2019

(87) PCT Pub. No.: WO2018/150932
PCT Pub. Date: Aug. 23, 2018

(65) Prior Publication Data
US 2020/0049271 A1   Feb. 13, 2020

(30) Foreign Application Priority Data
Feb. 16, 2017 (JP) .................................. 2017-027123

(51) Int. Cl.
*F16K 27/00* (2006.01)
*F16K 31/06* (2006.01)
(Continued)

(52) U.S. Cl.
CPC .............. *F16K 27/00* (2013.01); *F16K 31/06* (2013.01); *F15B 11/06* (2013.01);
(Continued)

(58) Field of Classification Search
CPC .......... F16K 27/00; F16K 47/02; F16K 31/06; F15B 11/06; F15B 13/0814; F15B 2211/8616
See application file for complete search history.

(56) References Cited

U.S. PATENT DOCUMENTS 3,504,704 A * 4/1970 Beckett ................... F16K 11/22
                                               137/625.64
4,565,259 A * 1/1986 Stoll ....................... F01N 1/082
                                               181/230
(Continued)

FOREIGN PATENT DOCUMENTS

JP       4-125303 A    4/1992
JP    2006-226377 A    8/2006
(Continued)

OTHER PUBLICATIONS

International Search Report dated May 15, 2018 in PCT/JP2018/003887 filed Feb. 6, 2018.

*Primary Examiner* — Angelisa L. Hicks
(74) *Attorney, Agent, or Firm* — Oblon, McClelland, Maier & Neustadt, L.L.P.

(57) ABSTRACT

Main channels are provided in a base body so as to pass through the base body in a direction of arranging valve mounting regions in a row. In addition, communicating openings are also provided in the base body so as to allow the main channels to communicate with a valve mounting surface that is the top surface of the base body. The communicating openings open at the valve mounting surface so as to cross the valve mounting regions, and silencers is installed in respective communicating openings so as to extend in the longitudinal direction of the communicating openings.

8 Claims, 4 Drawing Sheets

(51) Int. Cl.
  *F15B 11/06* (2006.01)
  *F15B 13/08* (2006.01)
  *F16K 47/02* (2006.01)

(52) U.S. Cl.
  CPC ... *F15B 13/0814* (2013.01); *F15B 2211/8616* (2013.01); *F16K 47/02* (2013.01)

(56) References Cited

U.S. PATENT DOCUMENTS 7,454,903 B2 * 11/2008 Matsumoto ........... F15B 15/202
  60/407
7,591,280 B2    9/2009 Narita et al.
9,322,308 B2 *  4/2016 Watanabe ............... F01N 1/003

FOREIGN PATENT DOCUMENTS

| | | |
|---|---|---|
| JP | 2007-32831 A | 2/2007 |
| JP | 2009-257554 A | 11/2009 |
| WO | WO 2017/104179 A1 | 6/2017 |

* cited by examiner

MANIFOLD BASE FOR ELECTROMAGNETIC VALVE AND MANIFOLD-TYPE ELECTROMAGNETIC VALVE

TECHNICAL FIELD

The present invention relates to a manifold base for mounting a plurality of solenoid valves thereon and also relates to a manifold-type electromagnetic valve in which the solenoid valves are mounted on the manifold base. More particularly, the present invention relates to a manifold base equipped with a silencer for attenuating exhaust noise and also relates to a manifold-type electromagnetic valve.

BACKGROUND ART

As described in Patent Literature, PTL 1 and PTL 2, a manifold base for mounting a plurality of solenoid valves thereon is known in the art. The manifold base has a main air supply channel and a main air discharge channel that are formed inside the manifold base so as to pass through the manifold base in the longitudinal direction thereof. The manifold base also has multiple communication holes for air supply and multiple communication holes for air discharge, both of which open at the top surface (solenoid valve mounting surface) of the manifold base. The communication holes for air supply are branched from the main air supply channel, and the communication holes for air discharge are branched from the main air discharge channel. When the manifold base is used, a pipe for supplying compressed air is connected to the opening of main air supply channel that opens at the end surface of the manifold base, and the plurality of solenoid valves are mounted on the solenoid valve mounting surface so as to be in alignment with the communication holes for air supply and the communication holes for air discharge.

In addition to the opening of the main air supply channel, an opening of the main air discharge channel also opens at the end surface of the manifold base, and a user may add a silencer for attenuating exhaust noise later and install it to the opening of the main air discharge channel. In relation to this, the applicants have proposed, in PTL 3, a manifold base for solenoid valve that is equipped with a silencer in advance. However, the proposed manifold base is a manifold base in which a silencer is additionally mounted in the opening of the main air discharge channel of the known manifold base described above, and the proposed manifold base still has a room for improvement and streamlining.

CITATION LIST

Patent Literature

PTL 1: Japanese Unexamined Patent Application Publication No. 2007-032831
PTL 2: Japanese Unexamined Patent Application Publication No. 2009-257554
PTL 3: Japanese Unexamined Patent Application Publication No. 2006-226377

SUMMARY OF INVENTION

Technical Problem

The present invention is made in view of the above situation, and a technical problem is to provide a manifold base for solenoid valve equipped with a silencer and also to provide a manifold-type electromagnetic valve that uses the manifold base, wherein a silencer for attenuating exhaust noise of solenoid valves is embedded in the manifold base, which enables streamlined designing of the manifold base for solenoid valve.

Solution to Problem

The present invention provides a manifold base for mounting the plurality of solenoid valves thereon in an arranged manner. The manifold base includes a base body having a valve mounting surface on which multiple valve mounting regions for mounting the solenoid valves thereon are arranged in a row, an air supply channel through which compressed air is supplied to the solenoid valves, and an air discharge channel through which air discharged from the solenoid valves is discharged to outside. The manifold base also includes a silencer that attenuates exhaust noise of the discharged air. In the manifold base, the air discharge channel is constituted by a main channel that passes through inside the base body in a direction of arranging the valve mounting regions in the row and also by a communicating opening that opens at the valve mounting surface and enable the main channel to communicate with the valve mounting regions. In addition, the silencer is installed inside the communicating opening.

In the manifold base according to the present invention, the communicating opening is formed as an elongated groove extending along the main channel, and the silencer is formed into a square bar made of a porous noise reduction material having air permeability.

In this case, it is preferable that the communicating opening be formed so as to successively cross all of the valve mounting regions and that the silencer be accommodated inside the communicating opening in such a manner that the silencer successively crosses all of the valve mounting regions.

It is desirable that a support groove be formed at a bottom of the main channel at a position opposing the communicating opening and that the silencer have a bottom portion installed inside the support groove.

The support groove may be formed between a pair of support walls that stand on a bottom wall of the main channel and that extend parallel to each other.

In a configuration according to the present invention, the air supply channel may be constituted by a main air supply channel through which compressed air to be supplied to the solenoid valves is simultaneously circulated and also by multiple branched air supply channels that are branched from the main air supply channel and that open at the valve mounting surface. In addition, the main air supply channel may pass through inside the base body so as to extend parallel to the air discharge channel.

In this case, two air discharge channels are disposed in both side regions of the main air supply channel, respectively.

The present invention provides a manifold-type electromagnetic valve that includes the manifold base configured as above and solenoid valves mounted on respective valve mounting regions of the valve mounting surface of the manifold base.

Advantageous Effects of Invention

The manifold base according to the present invention is configured such that an air discharge channel for circulating discharged air from solenoid valves is constituted by a main channel that passes through the base body and also by a communicating opening that enables the main channel to communicate with valve mounting regions. The manifold base is also configured such that a silencer is installed in the communicating opening in advance. Accordingly, compared with a known manifold base in which a silencer needs to be added later and attached to the opening of an air discharge channel, the silencer can be installed reliably and securely. Moreover, the manifold base enables, for example, structural simplification or size and weight reduction of the base body, in other words, the manifold base enables streamlined designing of the manifold base equipped with the silencer.

DESCRIPTION OF EMBODIMENT

A manifold base for solenoid valve according to the present invention will be described in detail with reference to the drawings. FIGS. 1 to 6 are views illustrating an embodiment of a manifold base 1 for solenoid valve according to the present invention and an embodiment of a manifold-type electromagnetic valve formed by using the manifold base 1.

Figure 1:
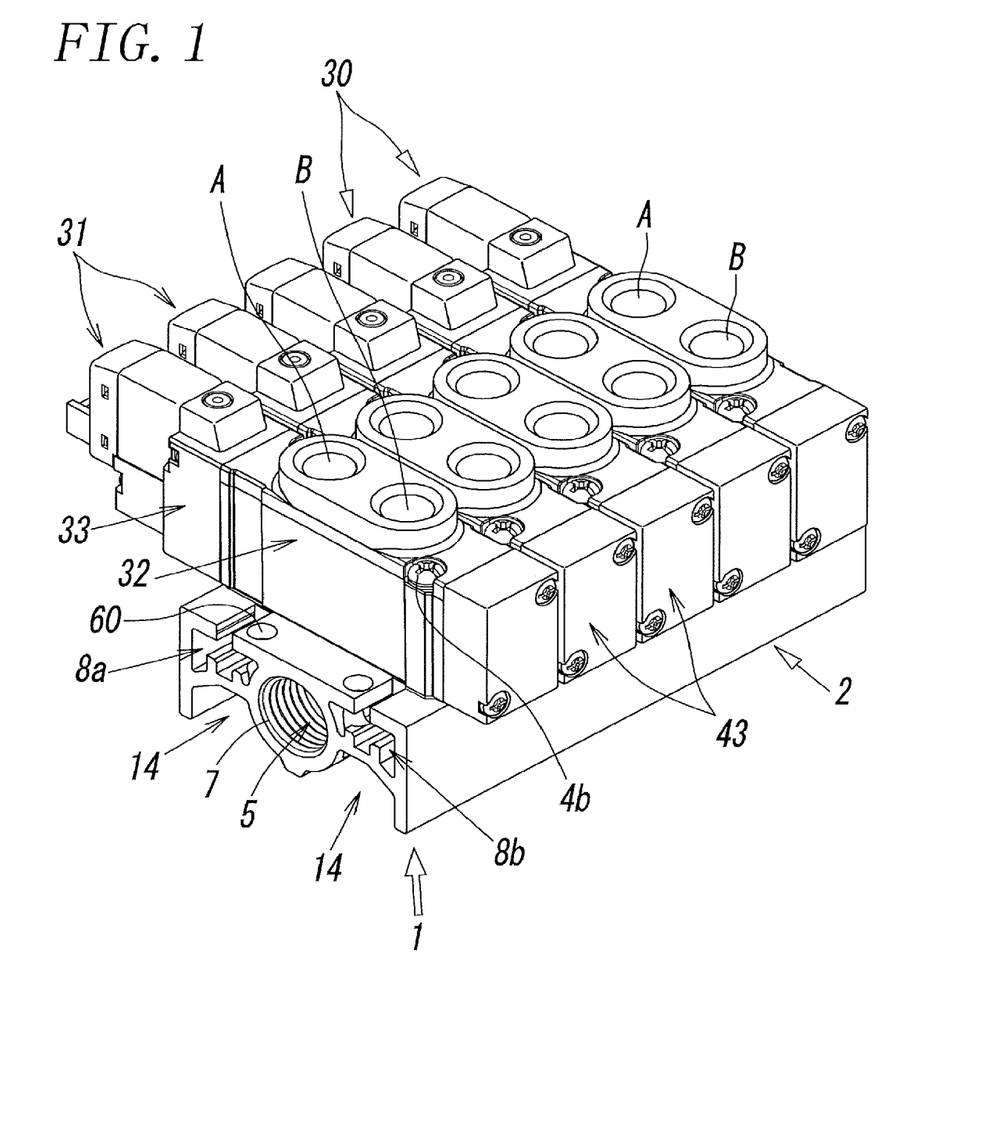
FIG. 1 is a perspective view illustrating an external appearance of a manifold-type electromagnetic valve that is formed by mounting the plurality of solenoid valves on a manifold base for solenoid valve according to the present invention.
Figure 2:
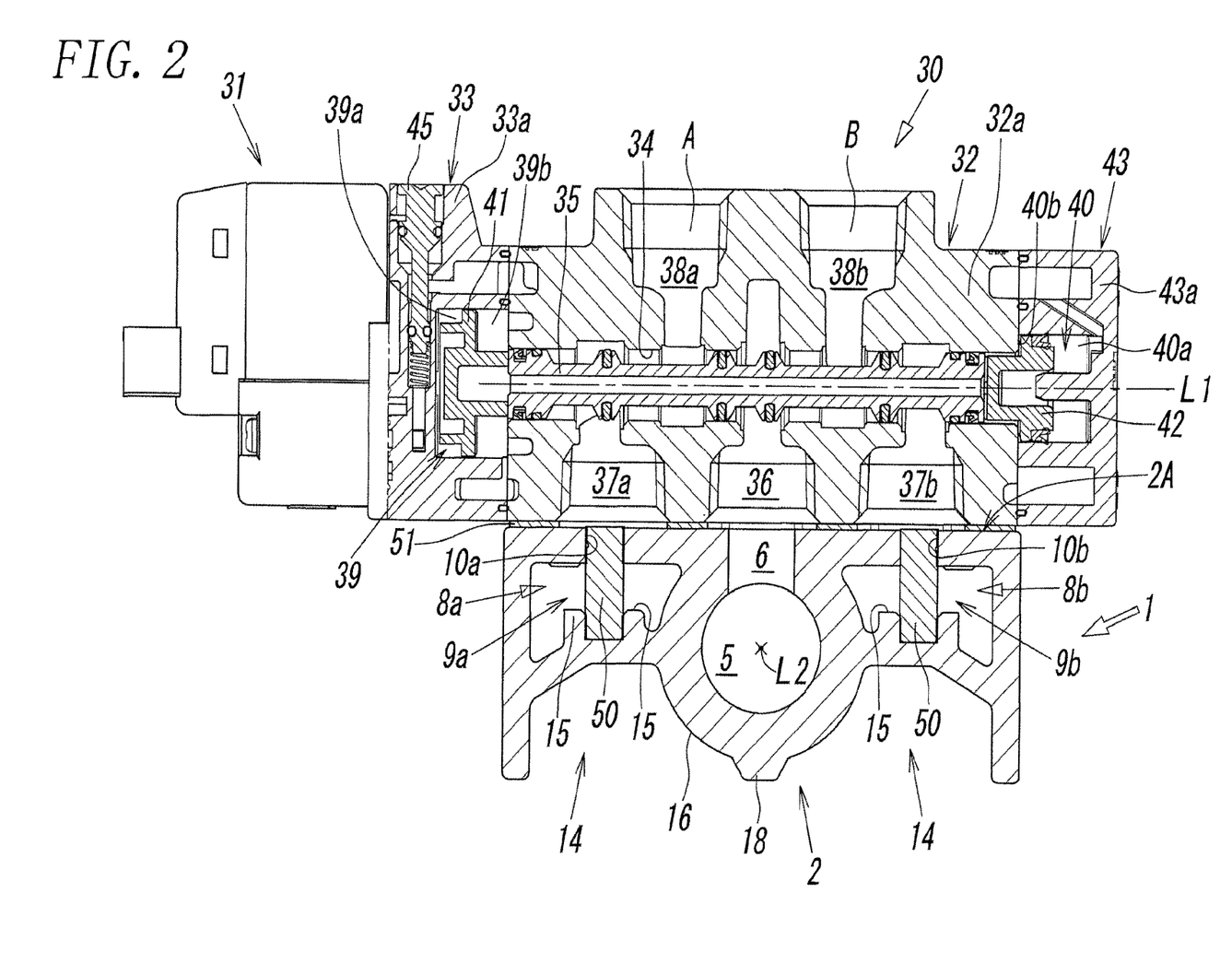
FIG. 2 is a cross-sectional view illustrating the manifold-type electromagnetic valve of FIG. 1.

As illustrated in FIGS. 1 and 2, the manifold base 1 on which the plurality of solenoid valves 30 are mounted constitutes the manifold-type electromagnetic valve. The manifold base 1 includes a base body 2. The base body 2 has a valve mounting surface 2A on which the solenoid valves 30 are mounted side by side in the width direction of the solenoid valves 30. The manifold base 1 also includes silencers 50. The silencers 50 are installed inside the base body 2 and attenuate exhaust noise of discharged air from each solenoid valve 30.

The solenoid valves 30 are known five-port solenoid valves having corresponding pilot valves 31. Each solenoid valve 30 includes output ports A and B for outputting compressed air supplied from the manifold base 1 toward an actuator (not illustrated). FIG. 1 illustrates an example configuration in which five solenoid valves 30 are mounted on the base body 2. Since the five solenoid valves 30 have an identical structure, one solenoid valve 30 will be described here with reference to FIG. 2.

As illustrated in FIG. 2, each solenoid valve 30 is constituted by a main valve portion 32, a first adapter portion 33 and a second adapter portion 43, and a pilot valve 31. The main valve portion 32 is shaped substantially like a cuboid, and the first adapter portion 33 is connected to one end of the main valve portion 32 in the direction of an axis L1 (longitudinal direction) and the second adapter portion 43 is connected to the other end of the main valve portion 32. The pilot valve 31 is connected to the first adapter portion 33. The main valve portion 32 includes a housing 32a that has a valve hole 34 passing therethrough in the direction of the axis L1. The valve hole 34 accommodates a spool 35. The valve hole 34 communicates with a supply hole 36, first and second discharge holes 37a and 37b, and first and second output holes 38a and 38b. In addition, the supply hole 36 and the two discharge holes 37a and 37b open at the bottom surface of the housing 32a, whereas the two output holes 38a and 38b open at the top surface of the housing 32a via corresponding two output ports A and B. The bottom surface of the housing 32a is a contact surface to be in contact with the valve mounting surface 2A of the base body 2.

The supply hole 36 are formed substantially at the center of the housing 32a in the longitudinal direction thereof, and the discharge holes 37a and 37b are formed in both side regions of the supply hole 36. In addition, the first output hole 38a is formed between the supply hole 36 and the first discharge hole 37a in the longitudinal direction of the housing 32a, and the second output hole 38b is formed between the supply hole 36 and the second discharge hole 37b. The spool 35 slides inside the valve hole 34 in the axial direction, which thereby switches channel connection among these holes.

The first adapter portion 33 and the second adapter portion 43 have respective bodies 33a and 43a. The first adapter portion 33 has a first cylinder chamber 39 defined by the surface of the body 33a that faces the main valve portion 32. The second adapter portion 43 has a second cylinder chamber 40 defined by the surface of the body 43a that faces the main valve portion 32. The first cylinder chamber 39 and the second cylinder chamber 40 communicate with the valve hole 34. The first cylinder chamber 39 accommodates a first piston 41, and the second cylinder chamber 40 accommodates a second piston 42. The first piston 41 and the second piston 42 are connected respectively to one end and the other end of the spool 35 in the axial direction thereof. The cylinder diameter of the first cylinder chamber 39 is larger than that of the second cylinder chamber 40, and accordingly the first piston 41 accommodated in the first cylinder chamber 39 is made larger in diameter than the second piston 42 accommodated in the second cylinder chamber 40.

A first pressure chamber 39a formed within the first cylinder chamber 39 (the left chamber with respect to the first piston 41 in FIG. 2) communicates with the supply hole 36 via the pilot valve 31. The pilot valve 31, which is a three-port solenoid valve, causes the first pressure chamber 39a to communicate with the supply hole 36 when the pilot valve 31 is on, and the pilot valve 31 causes the first pressure chamber 39a to block communication with the supply hole 36 and to open to the atmosphere when the pilot valve 31 is off. On the other hand, a second pressure chamber 40a formed within the second cylinder chamber 40 (the right chamber with respect to the second piston 42 in FIG. 2) is continuously in communication with the supply hole 36. In addition, chambers 39b and 40b, which are chambers within respective cylinder chambers 39 and 40 and are located near the spool 35, are continuously in communication with the atmosphere.

In the solenoid valve 30 configured as above, turning the pilot valve 31 on or off supplies pilot air to or discharges pilot air from the first pressure chamber 39a of the first cylinder chamber 39. Consequently, the spool 35 is reciprocally driven within the valve hole 34 due to the difference between forces generated by air pressure acting on the large piston 41 and the small piston 42, which thereby switches the connection state among the holes 36, 37a, 37b, 38a, and 38b. Reference numeral 45 in FIG. 2 denotes an operation member for manual operation. The operation member is provided for manually switching the connection state of the holes when the pilot valve 31 is on.

Note that since the structure of the above solenoid valve 30 is known and not directly related to the gist of the present invention, further description will be omitted.

Next, the manifold base 1 on which the solenoid valves 30 are mounted will be described.

Figure 3:
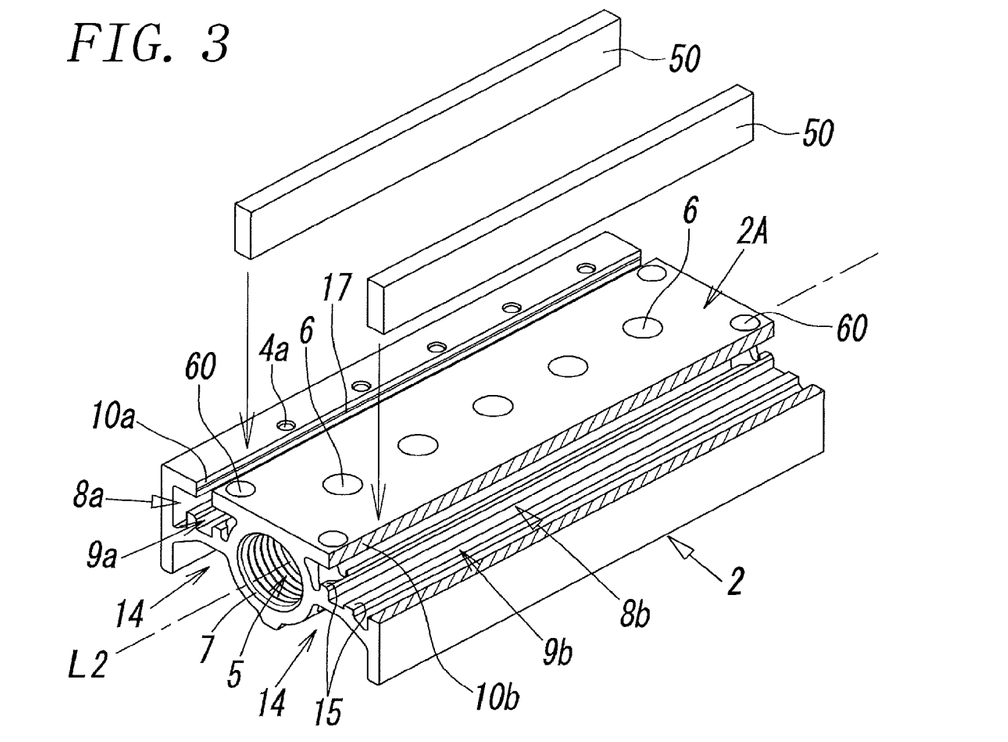
FIG. 3 is an exploded perspective view illustrating the manifold base.
Figure 4:
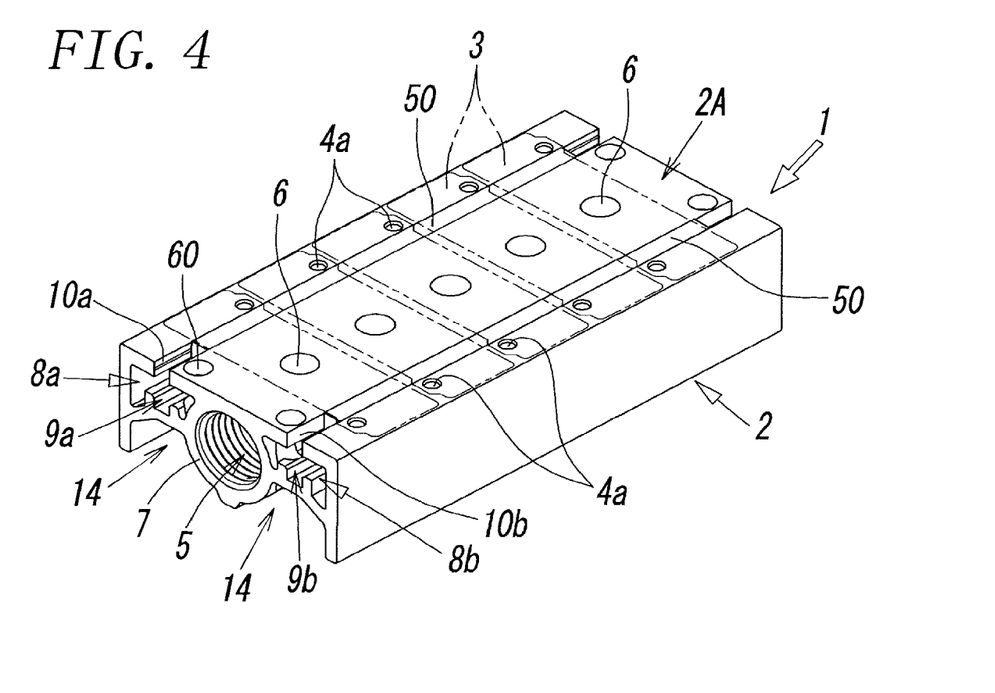
FIG. 4 is a perspective view illustrating the manifold base in which silencers are mounted in a base body from the state illustrated in FIG. 3.
Figure 5:
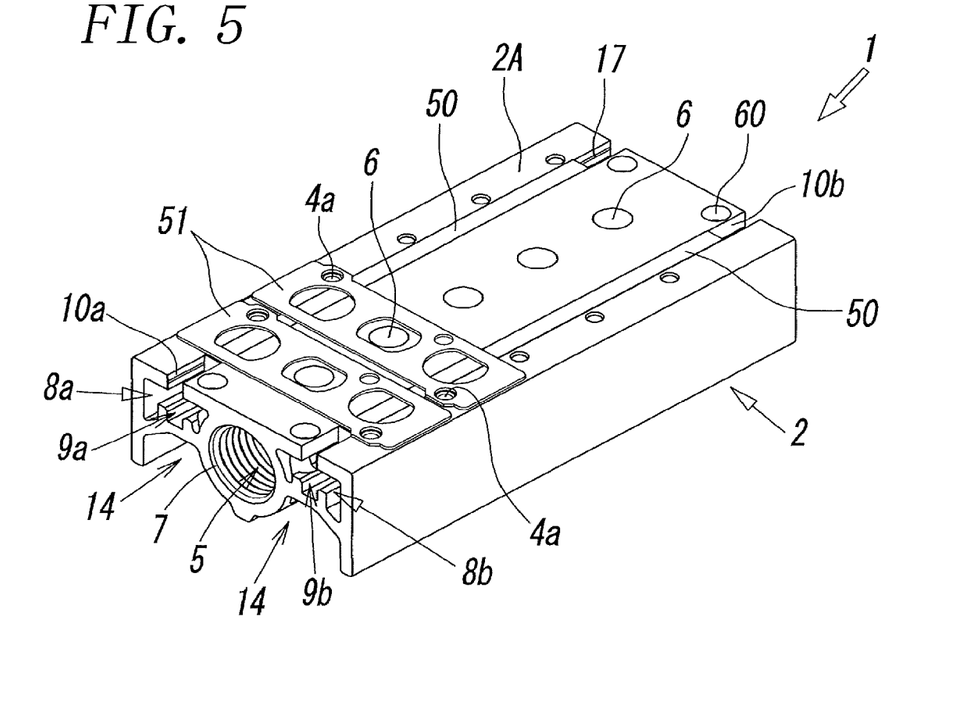
FIG. 5 is a perspective view illustrating a state in which gaskets are mounted on valve mounting regions of the manifold base illustrated in FIG. 4.

As illustrated in FIG. 1 and in FIGS. 3 to 5, the base body 2 constituting the manifold base 1 is a block-like member that is formed, for example by casting, into an elongated cuboid extending in the direction of an axis L2. The base body 2 has a flat top surface that is formed into the valve mounting surface 2A on which the solenoid valves 30 are mounted. As indicated by a chain line in FIG. 4, multiple valve mounting regions 3 for each mounting a solenoid valve 30 are disposed on the valve mounting surface 2A. The valve mounting regions 3 are arranged in a row in the longitudinal direction (in the direction of the axis L2) of the base body 2.

In the present embodiment, the valve mounting surface 2A is divided into five valve mounting regions 3, which are configured to arrange five solenoid valves 30 side by side. Note that the valve mounting regions 3 are not clearly divided by a mark such as a border line but may be divided by any suitable marks if necessary. Portions denoted by reference 4a in FIGS. 3 to 5 are threaded holes for fixing the solenoid valves 30 onto the base body 2 with fixing screws 4b. In the illustrated example, two threaded holes 4a are provided at diagonal positions within each valve mounting region 3, and the two threaded holes 4a define each valve mounting region 3. The length of the base body 2 in the lateral direction (width direction) thereof is set substantially equal to the length of the housing 32a of the solenoid valve 30 in the direction of the axis L1 (see FIG. 1 or FIG. 2).

As illustrated in FIGS. 2 to 5, a main air supply channel 5 and branched air supply channels 6 for supplying compressed air to the solenoid valves 30 are formed inside the base body 2. The main air supply channel 5 is a channel for supplying compressed air simultaneously to the plurality of solenoid valves 30. The branched air supply channels 6 are channels that are branched from the main air supply channel 5 and open at respective valve mounting regions 3 of the valve mounting surface 2A. The main air supply channel 5 has a substantially circular cross section and passes through the base body 2 in the longitudinal direction thereof at a central position of the base body 2 in the lateral direction (width direction) thereof. The main air supply channel 5 has end openings 7 that open at both end surfaces of the base body 2. A female thread is formed on the inner circumferential wall of the main air supply channel 5 at each end opening 7. An instant connection-type pipe joint having a male thread formed on the outer circumferential surface, for example, can be installed by screwing in the end opening 7.

The branched air supply channels 6 are channels for sending compressed air supplied from the main air supply channel 5 to individual solenoid valves 30. As illustrated in FIG. 2, the branched air supply channels 6 pass straight through the base body 2 between the inner circumferential wall of the main air supply channel 5 and the valve mounting surface 2A. Each branched air supply channel 6 has a circular cross section as is similar to the main air supply channel 5, and the diameter of the cross section is smaller than that of the main air supply channel 5. In the present embodiment, as illustrated in FIG. 4, each branched air supply channel 6 opens at a corresponding valve mounting region 3, and accordingly a total of five branched air supply channels 6 are formed in a row in the longitudinal direction of the base body 2. In addition, each branched air supply channel 6 opens at a central portion of the base body 2, in other words, at a central portion of the valve mounting surface 2A in the lateral direction thereof.

The base body 2 also has a first air discharge channel 8a and a second air discharge channel 8b for discharging the air discharged from the solenoid valves 30 out of the base body 2. As illustrated in FIG. 2, the first air discharge channel 8a and the second air discharge channel 8b are shaped in symmetry in cross section and also in disposition with respect to the vertical plane passing through the axis L2 of the main air supply channel 5.

The first air discharge channel 8a is constituted by a first main channel 9a and a first communicating opening 10a. The second air discharge channel 8b is also constituted by a second main channel 9b and a second communicating opening 10b. The first and second main channel 9a and 9b pass through the base body 2 in a direction parallel to the direction of arranging the valve mounting regions 3 (i.e., the longitudinal direction of the base body 2). The first and second communicating opening 10a and 10b are shaped like grooves that enable corresponding main channels 9a and 9b to communicate with the valve mounting surface 2A of the base body 2. In addition, the silencers 50 for attenuating the exhaust noise of the air discharged from the solenoid valves 30 engage respective first and second communicating opening 10a and 10b. In the present embodiment, the first main channel 9a and the first communicating opening 10a communicate with each other, and the second main channel 9b and the second communicating opening 10b communicate with each other.

The following describes specific configurations of the first and second main channels 9a and 9b and of the first and second communicating openings 10a and 10b. Note that as described above, the first and second air discharge channels 8a and 8b substantially have the same configuration except for the cross sections that are shaped in bilateral symmetry. Accordingly, the second air discharge channel 8b will be described below with reference to FIG. 6, while the description on the first air discharge channel 8a will be omitted.

Figure 6:
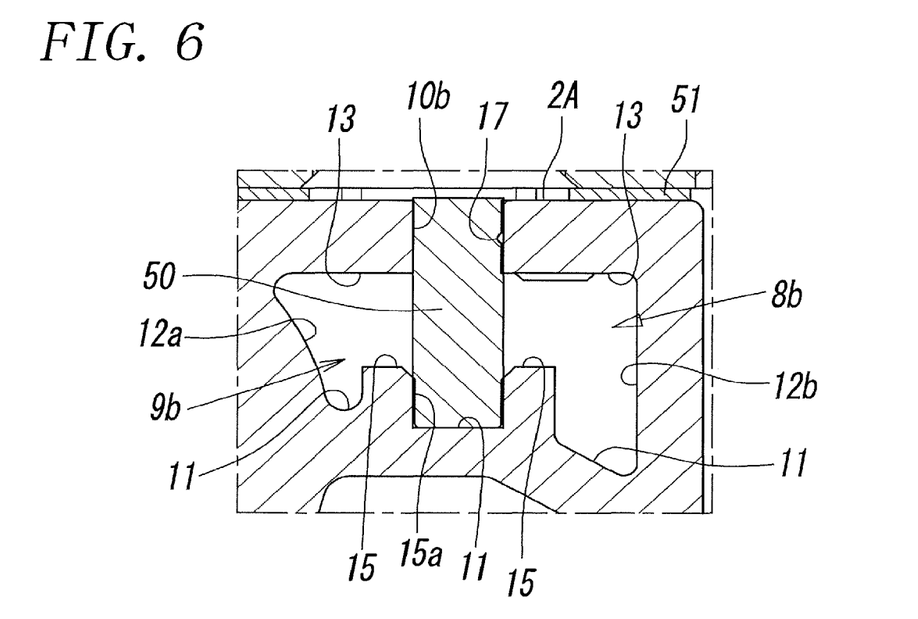
FIG. 6 is an enlarged cross-sectional view illustrating part of an air discharge channel of FIG. 2.

The second main channel 9b of the second air discharge channel 8b is formed so as to have a bottom wall 11, right and left side walls 12a and 12b that continue to the bottom wall 11, and top wall 13 that is connected to the top ends of the right and left side walls 12a and 12b and that extends along the valve mounting surface 2A. The second communicating opening 10b is formed in the top wall 13 so as to extend from one end of the base body 2 to the other end. The opening width of the second communicating opening 10b is constant over the entire length.

The side wall 12a, which is one of the side walls, of the second main channel 9b is formed as an arcuate surface that is formed concentrically with the circular circumferential wall of the main air supply channel 5 (see FIG. 2). The side wall 12b, which is the other side wall, has a flat surface extending vertically along the side surface of the base body 2. The side wall 12b extends to a level below the side wall 12a. Accordingly, the bottom wall 11 declines from left to right as illustrated.

A pair of support walls 15 are formed on the bottom of the second main channel 9b in such a manner that the support walls 15 stand vertically in a direction from the bottom wall 11 toward top wall 13 and in parallel with each other. A support groove 15a is formed between the support walls 15. As the support walls 15 extend from one end of the base body 2 to the other end, the support groove 15a also extends from one end of the base body 2 to the other end. The support groove 15a is formed for supporting the bottom end of a silencer 50. The support groove 15a is positioned directly below the second communicating opening 10b and has a constant width over the entire length of the support groove 15a. The width of the support groove 15a is substantially equal to the width of the second communicating opening 10b.

The top ends of respective support walls 15 are shaped into flat surfaces having the same height. The top ends of inner surfaces of the support walls 15, in other words, the top ends of walls of the support groove 15a, are chamfered.

As illustrated in FIGS. 2 to 6, the first and second communicating openings 10a and 10b open at the valve mounting surface 2A so as to successively cross multiple valve mounting regions 3 on the valve mounting surface 2A. More specifically, the first and second communicating openings 10a and 10b are formed so as to continue from the horizontally formed valve mounting surface 2A to corresponding main channels 9a and 9b. The first and second communicating openings 10a and 10b enable the main channels 9a and 9b to communicate directly with the valve mounting surface 2A located thereabove. In addition, the first and second communicating openings 10a and 10b are formed along the main channels 9a and 9b so as to cross all of the valve mounting regions 3 (see FIG. 4). Moreover, the two communicating openings 10a and 10b are formed in respective lateral side regions of the base body 2 so as to extend parallel to each other with the branched air supply channels 6 interposed therebetween.

With this configuration, when each solenoid valve 30 is mounted on the valve mounting surface 2A, the first communicating opening 10a is connected to the first discharge hole 37a of the solenoid valve 30, and the second communicating opening 10b is connected to the second discharge hole 37b of the solenoid valve 30 (see FIG. 2).

Note that in the present embodiment, the opening widths of the first and second communicating openings 10a and 10b are made narrower than corresponding maximum channel widths (the distance between opposing side walls 12a and 12b) of the first and second main channels 9a and 9b, and are also made narrower than the opening widths of the first and second discharge holes 37a and 37b when measured in the longitudinal direction of each solenoid valve 30.

Engagement protrusions 17 are formed on the walls of the first and second communicating openings 10a and 10b. The engagement protrusions 17 bite and engage respective silencers 50 installed in the first and second communicating openings 10a and 10b and thereby suppress the likelihood of the silencers 50 coming off or being displaced from the first and second communicating openings 10a and 10b. The engagement protrusions 17 are protrusions extending longitudinally along the communicating openings 10a and 10b. Each engagement protrusion 17 is formed on one of the opposing walls of each of the communicating openings 10a and 10b. Each engagement protrusion 17 has a circular cross section, which enables smooth attachment/detachment of the silencer 50 during replacement and suppresses the likelihood of the silencer 50 being damaged or broken.

As illustrated in FIGS. 2 and 3, each silencer 50 is formed as a single body made of a porous noise reduction material having air permeability. More specifically, the silencer 50 is formed into an elongated stick (square bar) having a rectangular cross section with a longitudinal length and a lateral length. The silencer 50 is installed in each of the first and second communicating openings 10a and 10b vertically with the longitudinal direction of the cross section being aligned in the vertical direction. The lateral length of cross section (i.e., thickness) of the silencer 50 is substantially equal to each width of the first and second communicating openings 10a and 10b, and the longitudinal length of cross section (i.e., height) of the silencer 50 is substantially equal to the direct distance between the bottom of each support groove 15a and the valve mounting surface 2A.

In the state in which the silencer 50 having such dimensions engages each of the first and second communicating openings 10a and 10b, the silencer 50 extends from the valve mounting surface 2A to the bottom of each support groove 15a. The top portion of the silencer 50 is supported by each of the communicating openings 10a and 10b and the bottom portion of the silencer 50 is supported by each support groove 15a. Thus, the top surface of the silencer 50 and the valve mounting surface 2A are substantially flush with each other. The first and second main channels 9a and 9b are each partitioned by the corresponding silencer 50 into two regions. The air discharged from the solenoid valves 30 passes through the silencer 50 and flows into cavities formed in both side regions of the silencer 50 in each of the main channels 9a and 9b. The air is discharged through the cavities to the outside (to the atmosphere).

A cellular porous medium having interconnecting cells or a fibrous aggregate formed by entangled fibers, for example, can be preferably used as the noise reduction material. However, the noise reduction material is not limited to such materials.

As illustrated in FIG. 3, a pair of mounting holes 60 that pass through the base body 2 from the valve mounting surface 2A to the bottom surface thereof is formed at one end portion of the base body 2 in the longitudinal direction and also at the other end portion. These mounting holes 60 are used to fix the base body 2 at a predetermined installation place by inserting mounting members such as screws. The mounting holes 60 are formed at positions adjacent to the first and second communicating openings 10a and 10b. The length of each silencer 50 along the axis L2 is shorter than the length of the base body 2 in the longitudinal direction thereof. More specifically, the length of each silencer 50 is shorter than the distance between two mounting holes 60 located longitudinally at one and the other end portions of the base body 2 along each of the communicating opening 10a and 10b.

Note that a pair of right and left thinning grooves 14 are formed at the bottom side of the base body 2 along respective air discharge channels 8a and 8b (main channels 9a and 9b) so as to extend from one end of the base body 2 to the other end in the longitudinal direction. The thinning grooves 14 are recessed into the base body 2 in the height direction so as to leave intact the portion of the base body 2 in which the main air supply channel 5 and the main channels 9a and 9b of the first and second air discharge channels 8a and 8b are formed. Providing the thinning grooves 14 can reduce the weight of the base body 2 and accordingly reduce the production cost. As a result of providing the thinning grooves 14, an arcuate bottom 16 is formed on the bottom surface of the base body 2 at the laterally central position. The arcuate bottom 16 has an arcuate surface formed concentrically with the opening of the main air supply channel 5. In addition, a protrusion 18 is formed on the arcuate bottom 16 so as to extend in the longitudinal direction of the base body 2. The protrusion 18 serves as a foot when the base body 2 is installed at an installation place.

The following specifically describes a manifold-type electromagnetic valve in which the plurality of solenoid valves 30 are mounted on the manifold base 1 having the above-described configuration. Note that although solenoid valves 30 are mounted on all of the valve mounting regions 3 of the valve mounting surface 2A in FIG. 1, a single solenoid valve 30 will be described below since these solenoid valves 30 substantially has the same configuration as described above. Note that specific operations of the solenoid valve 30 having the above configuration are known in the art, and accordingly description on the specific operations will be omitted. In addition, depending on the number of actuators to be controlled, the number of solenoid valves 30 may be less than the number of valve mounting regions 3 formed on the valve mounting surface 2A. In this case, plugs are used to airtightly close the branched air supply channels 6 that open in unused valve mounting regions 3. Alternatively, sealing members, such as plates, may be used to cover the unused valve mounting regions 3 airtightly.

In assembling the above manifold-type electromagnetic valve, two silencers 50 are first pushed into corresponding first and second communicating openings 10a and 10b, as illustrated in FIG. 3, from above the valve mounting surface 2A of the base body 2 in the directions indicated by downward pointing arrows. At this time, as illustrated in FIG. 2, the silencers 50 are pushed so as to come into contact with respective bottom surfaces of support grooves 15a of the first and second main channels 9a and 9b. Thus, as described above, the bottom portions of the silencers 50 engage the support grooves 15a and are thereby supported, while the top portions of the silencers 50 are supported by the first and second communicating openings 10a and 10b, and the top surfaces of the silencers 50 become substantially flush with the valve mounting surface 2A. Here, the silencers 50 engage the engagement protrusions 17.

Next, as illustrated in FIG. 5, a sealing member 51, such as a gasket, is disposed on each of the valve mounting regions 3 of valve mounting surface 2A of the base body 2, and each solenoid valve 30 is fixed onto the base body 2 with the sealing member 51 interposed therebetween. In the state in which the solenoid valve 30 is mounted, as illustrated in FIG. 2, the supply hole 36 of the solenoid valve 30 communicates with a branched air supply channel 6 of the base body 2, and the first and second discharge holes 37a and 37b of the solenoid valve 30 communicate with corresponding first and second communicating openings 10a and 10b of the base body 2.

Note that the first and second output ports A and B of the solenoid valve 30 are connected, for example, to respective pressure chambers of a pneumatic actuator such as a double acting cylinder (not illustrated). In addition, compressed air is supplied to the main air supply channel 5 of the base body 2 from a pneumatic source (not illustrated).

When the pilot valve 31 is in the non-energized state (OFF state), as illustrated in FIG. 2, the spool 35 is urged in one direction (in the leftward direction in FIG. 2), which causes the supply hole 36 of the solenoid valve 30 to communicate with the second output hole 38b of the second output port B and also causes the first discharge hole 37a to communicate with the first output hole 38a of the first output port A.

This is a first communication state. In the first communication state, compressed air supplied from the main air supply channel 5 to the supply hole 36 via a branched supply channel 6 is output from the second output port B to the actuator, while compressed air from the first output port A, in other words, discharged air from the actuator, is discharged out of the base body 2 (to the atmosphere) through the first air discharge channel 8a of the base body 2, in other words, through the first communicating opening 10a and the first main channel 9a. Here, the discharged air is discharged through the first main channel 9a to the atmosphere after the exhaust noise is attenuated (absorbed) by the silencer 50 installed in the first communicating opening 10a.

On the contrary, when the pilot valve 31 is in the energized state (ON state), the spool 35 is urged in the other direction (in the rightward direction in FIG. 2), which causes the supply hole 36 to communicate with the first output hole 38a of the first output port A and also causes the second discharge hole 37b to communicate with the second output hole 38b of the second output port B.

This is a second communication state. In the second communication state, compressed air supplied to the supply hole 36 is output from the first output port A to the actuator, while compressed air from the second output port B, in other words, discharged air from the actuator, is discharged out of the base body 2 through the second air discharge channel 8b of the base body 2, in other words, through the second communicating opening 10b and the second main channel 9b. Here, the discharged air is discharged through the second main channel 9b to the atmosphere after the exhaust noise is attenuated (absorbed) by the silencer 50 installed in the second communicating opening 10b.

As described above, the manifold base 1 is configured such that the silencers 50 for attenuating the exhaust noise of the discharged air from the solenoid valves 30 are installed in respective first and second communicating openings 10a and 10b that open at the valve mounting surface 2A of the base body 2. In other words, the base body 2 is designed so as to enable the silencers 50 to be embedded therein in advance. As a result, compared with a known manifold base in which a silencer needs to be added later to the opening of the main air discharge channel of the manifold base, the manifold base 1 enables the silencers to be mounted thereon securely and reliably. Moreover, the manifold base 1 enables, for example, structural simplification or size and weight reduction of the base body 2, in other words, the manifold base 1 enables streamlined designing of a manifold base equipped with a silencer.

The manifold base according to the present invention and the manifold-type electromagnetic valve using the manifold base have been described in detail. However, the present invention is not limited to the above embodiment but may be subjected to various design alterations without departing from the gist of the appended claims.

For example, in the present embodiment, single pilot-type solenoid valves 30 each equipped with a single pilot valve 31 are mounted on the valve mounting surface 2A of the base body. However, double pilot-type solenoid valves each having two pilot valves may be mounted thereon.

In addition, the first and second communicating openings 10a and 10b are formed so as to cross all of the valve mounting regions 3 on the valve mounting surface 2A. However, it may be sufficient that the first and second communicating openings 10a and 10b open at each of the valve mounting regions 3. For example, the first and second communicating openings 10a and 10b may be formed individually at each of the valve mounting regions 3. Alternatively, the valve mounting regions 3 may be grouped into multiple groups, and the first and second communicating openings 10a and 10b may open for each group and may be formed so as to cross the valve mounting regions 3 included in each group. In this case, the silencers 50 are divided into multiple bodies in accordance with the number of the communicating openings 10*a* and 10*b*.

Moreover, the silencer 50 has been described as a single body made of a noise reduction material. However, it may be sufficient that the silencer 50 is formed such that the noise reduction material is disposed at least at each of the valve mounting regions 3 on the valve mounting surface 2A. For example, in the case of the silencer 50 installed in each of the communicating openings 10*a* and 10*b* that are formed so as to cross multiple valve mounting regions 3, the silencer 50 may be formed by using the noise reduction members and non-permeable members. In other words, the silencer 50 may be formed by combining the noise reduction members with non-permeable members in such a manner that the noise reduction members are disposed at valve mounting regions 3 and the non-permeable members are disposed between adjacent valve mounting regions 3.

REFERENCE SIGNS LIST 1 manifold base
2 base body
2A valve mounting surface
3 valve mounting region
5 main air supply channel
6 branched air supply channel
8*a*, 8*b* air discharge channel
9*a*, 9*b* main channel
10*a*, 10*b* communicating opening
15 support walls
15*a* support groove
30 solenoid valve
50 silencer

The invention claimed is:

1. A manifold base for mounting plurality of solenoid valves thereon in an arranged manner, the manifold base comprising:
    a base body having
        a valve mounting surface on which multiple valve mounting regions for mounting the solenoid valves thereon are arranged in a row,
        an air supply channel through which compressed air is supplied to the solenoid valves, and
        an air discharge channel through which air discharged from the solenoid valves is discharged to outside; and
    a silencer that attenuates exhaust noise of the discharged air, wherein
    the air discharge channel is constituted by
        a main channel that passes through inside the base body in a direction of arranging the valve mounting regions in the row, and
        a communicating opening that opens at the valve mounting surface and enable the main channel to communicate with the valve mounting regions, and
    the silencer is installed inside the communicating opening.

2. The manifold base according to claim 1, wherein
    the communicating opening is formed as an elongated groove extending along the main channel, and
    the silencer is formed into a square bar made of a porous noise reduction material having air permeability.

3. The manifold base according to claim 2, wherein
    the communicating opening is formed so as to successively cross all of the valve mounting regions, and
    the silencer is accommodated inside the communicating opening in such a manner that the silencer successively crosses all of the valve mounting regions.

4. The manifold base according to claim 2, wherein
    a support groove is formed at a bottom of the main channel at a position opposing the communicating opening, and
    the silencer has a bottom portion installed inside the support groove.

5. The manifold base according to claim 4, wherein
    the support groove is formed between a pair of support walls that stand on a bottom wall of the main channel and that extend parallel to each other.

6. The manifold base according to claim 1, wherein
    the air supply channel is constituted by
        a main air supply channel through which compressed air to be supplied to the solenoid valves is simultaneously circulated and
        multiple branched air supply channels that are branched from the main air supply channel and that open at the valve mounting surface, and
    the main air supply channel passes through inside the base body so as to extend parallel to the air discharge channel.

7. The manifold base according to claim 6, wherein two air discharge channels are disposed in both side regions of the main air supply channel, respectively.

8. A manifold-type electromagnetic valve comprising:
    the manifold base according to claim 1, and
    solenoid valves mounted on respective valve mounting regions of the valve mounting surface of the manifold base.

* * * * *